United States Patent
Luan et al.

(10) Patent No.: US 9,335,934 B2
(45) Date of Patent: May 10, 2016

(54) SHARED MEMORY CONTROLLER AND METHOD OF USING SAME

(71) Applicant: Futurewei Technologies, Inc., Plano, TX (US)

(72) Inventors: Hao Luan, Plano, TX (US); Alan Gatherer, Richardson, TX (US); Yan Bei, Shanghai (CN); Jun Ying, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 225 days.

(21) Appl. No.: 14/265,127

(22) Filed: Apr. 29, 2014

(65) Prior Publication Data

US 2015/0309725 A1    Oct. 29, 2015

(51) Int. Cl.
*G06F 12/00* (2006.01)
*G06F 3/00* (2006.01)
*G06F 3/06* (2006.01)

(52) U.S. Cl.
CPC .............. *G06F 3/061* (2013.01); *G06F 3/0659* (2013.01); *G06F 3/0673* (2013.01)

(58) Field of Classification Search
CPC ...... G06F 3/061; G06F 3/0659; G06F 3/0673
See application file for complete search history.

(56) References Cited

U.S. PATENT DOCUMENTS

2005/0251639 A1    11/2005    Vishin et al.
2008/0098151 A1*   4/2008    Purcell ................ G06F 13/1647
                                                                    710/317
2013/0013879 A1    1/2013    Yamada et al.

FOREIGN PATENT DOCUMENTS

CN    101495975 A    7/2009
CN    102609312 A    7/2012
CN    103377154 A    10/2013

OTHER PUBLICATIONS

International Search Report and Written Opinion of the International Searching Authority received in Patent Cooperation Treaty Application No. PCT/CN2015/077719 mailed Jul. 31, 2015, 12 pages.

* cited by examiner

*Primary Examiner* — John Lane
(74) *Attorney, Agent, or Firm* — Slater Matsil, LLP

(57) ABSTRACT

Disclosed herein are a shared memory controller and a method of controlling a shared memory. An embodiment method of controlling a shared memory includes concurrently scanning-in a plurality of read/write commands for respective transactions. Each of the plurality of read/write commands includes respective addresses and respective priorities. Additionally, each of the respective transactions is divisible into at least one beat and at least one of the respective transactions is divisible into multiple beats. The method also includes dividing the plurality of read/write commands into respective beat-level read/write commands and concurrently arbitrating the respective beat-level read/write commands according to the respective addresses and the respective priorities. Concurrently arbitrating yields respective sequences of beat-level read/write commands corresponding to the respective addresses. The method further includes concurrently dispatching the respective sequences of beat-level read/write commands to the shared memory, thereby accessing the shared memory.

32 Claims, 5 Drawing Sheets

SHARED MEMORY CONTROLLER AND METHOD OF USING SAME

TECHNICAL FIELD

The present invention relates generally to a system and method for controlling a shared memory and, in particular embodiments, to a shared memory controller and method for controlling a shared memory.

BACKGROUND

The prevalence of multi-core system-on-a-chip (SOC) is increasing. A typical multi-core SOC includes multiple processing cores that share a memory space. A processing core can be a variety of processing devices, such as a microprocessor, a digital signal processor (DSP), a central processing unit (CPU), or a processing core, among others, which are all referred to as processors. The shared memory can also take a variety of forms, such as flash or dynamic random access memory (DRAM), among others. The shared memory is often divided into multiple physical blocks of memory. Each of the multiple processing cores accesses the shared memory through a shared memory controller. The shared memory controller regulates the flow of data among the various processing cores and the multiple physical blocks of memory. The shared memory controller is often a bottleneck for SOC performance.

SUMMARY OF THE INVENTION

Embodiments of the present invention provide a shared memory controller and a method of controlling a shared memory.

An embodiment method of controlling access to a shared memory includes concurrently scanning-in a plurality of read/write commands for respective transactions. Each of the plurality of read/write commands includes respective addresses and respective priorities. Additionally, each of the respective transactions is divisible into at least one beat and at least one of the respective transactions is divisible into multiple beats. The method also includes dividing the plurality of read/write commands into respective beat-level read/write commands and concurrently arbitrating the respective beat-level read/write commands according to the respective addresses and the respective priorities. Concurrently arbitrating yields respective sequences of beat-level read/write commands corresponding to the respective addresses. The method further includes concurrently dispatching the respective sequences of beat-level read/write commands to the shared memory, thereby accessing the shared memory.

An embodiment controller for a shared memory includes a command scanner and a plurality of read/write arbiters. The command scanner is configured to concurrently scan-in a plurality of read/write commands for respective transactions and divide each of the respective transactions into respective beat-level read/write commands. The plurality of read/write arbiters correspond to a plurality of shared memory blocks in the shared memory and are coupled to the command scanner. The plurality of read/write arbiters are configured to concurrently arbitrate the respective beat-level read/write commands according to respective priorities, yielding respective sequences of beat-level read/write commands corresponding to the plurality of shared memory blocks. The plurality of read/write arbiters is further configured to concurrently dispatch the respective sequences to the plurality of shared memory blocks to access the plurality of shared memory blocks.

An embodiments system on a chip (SOC) includes a plurality of shared memory blocks, a plurality of processors, and a shared memory controller. The plurality of shared memory blocks has a plurality of respective addresses. The plurality of processors is configured to generate a plurality of respective read/write commands to access the plurality of shared memory blocks via corresponding transactions. The corresponding transactions are each divisible into respective pluralities of beats. The shared memory controller is coupled between the plurality of shared memory blocks and the plurality of processors. The shared memory controller includes a command scanner and a plurality of read/write arbiters. The command scanner is configured to concurrently scan-in and divide the plurality of respective read/write commands into respective pluralities of beat-level read/write commands. The plurality of read/write arbiters correspond to the plurality of shared memory blocks and are configured to concurrently arbitrate the respective pluralities of beat-level read/write commands for the plurality of shared memory blocks according to respective priorities. The concurrent arbitration yields respective sequences of beat-level read-write commands. The plurality of read/write arbiters is also configured to concurrently dispatch the respective sequences to the plurality of shared memory blocks.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
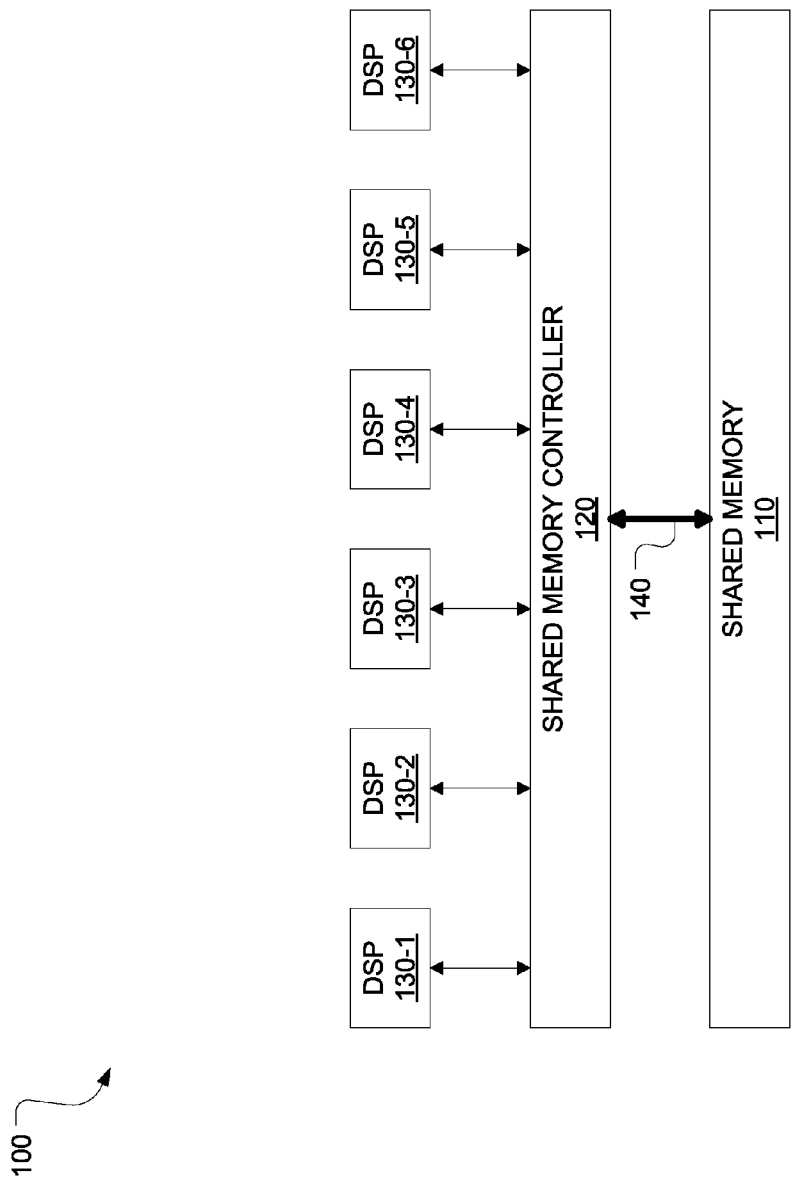
FIG. 1 is a block diagram of one embodiment of an SOC having a shared memory.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

On a typical SOC having at least one processor, a shared memory and a shared memory controller, a processor accesses the shared memory via a transaction, which is essentially a read or a write. The processor generates a read or a write command and submits it to the shared memory controller. If limited to a single processing core, a read/write command is simply executed and the memory accessed. In a multi-core SOC, each of the cores can simultaneously generate read/write commands, each corresponding to a transaction. The multiple read/write commands are arbitrated to determine which is to be carried out and when.

One transaction aims to either read or write some amount of data from or to the shared memory. The amount of data that can be read or written to a given physical block of memory in a given clock cycle generally is limited by the size of the bus that couples the shared memory to the SOC. If the bus is 8 bits wide, then a maximum of 8 bits (1 byte) can be written to the given physical block of memory per clock cycle. Likewise, if the bus is 32 bits wide, then the maximum is 32 bits (4 bytes). Each transaction can be divided into smaller portions to suit the bus. Each of these smaller portions is referred to as a beat, which has a size to match the bus width. For example, on an SOC having an 8 bit bus width, a transaction to read or write 64 bits of data to the shared memory would be divided into 8 beats, each beat having a size of 8 bits. Each beat of a transaction can be independently addressed, which means a given transaction can cause data to be read from or written to one or more physical blocks of memory. Blocks of memory can be addressed absolutely, or can be addressed by a memory block number and an offset within the block. Additionally, certain types of memory can handle multiple simultaneous read and write commands, while others can handle only one read or write command, and others can handle only one read and one write.

A typical shared memory controller relies on a switching fabric to regulate the flow of read/write commands and data among the multiple processing cores, the shared memory controller, and the shared memory. The switching fabric generally arbitrates traffic generated by multiple processing cores at a transaction level granularity, which degrades the performance of multi-core SOCs, particularly the read and write access latencies. The one transaction allowed to access the shared memory has some number of beats. In the example above, the 64 bit read/write transaction requires 8 beats over an 8-bit bus. Over the course of the transaction, which is 8 clock cycles, those 8 beats are dispatched to the appropriate physical memory block. Then another transaction is allowed through the switching fabric. As mentioned above, on a multi-core SOC, multiple transactions can arrive at the switching fabric simultaneously. For example, assume another transaction of 32 bits arrives concurrently with the 64 bit transaction above. Also assume the 64 bit transaction is higher priority. In that case, the 32 bit transaction waits 8 clock cycles before it is dispatched to the shared memory.

Many multi-core SOCs utilizing a switching fabric limit the size of transactions to a certain number of beats to reduce worst-case read/write latencies. Otherwise, one large high-priority transaction can occupy the shared memory controller indefinitely, causing high latencies for all other transactions. With a transaction size maximum, read/write latencies can be mitigated to an extent.

Introduced herein is a shared memory controller configured to concurrently scan-in the active commands from the one or more processing cores and perform concurrent beat-level arbitration. Beat-level arbitration can improve read/write access latencies. Additionally, it is realized herein, the shared memory controller can employ interleaved memory that allows concurrent dispatch of read/write beats to the various physical blocks of memory. In alternative embodiments, the memory can be organized linearly.

FIG. 1 is a block diagram of one embodiment of a SOC 100 within which the shared memory controller or method of controlling shared memory may be embodied or carried out. SOC 100 includes a shared memory 110 coupled to a shared memory controller 120 by a bus 140. SOC 100 also includes DSPs 130-1 through 130-6. Alternative embodiments can include any number of processors, processor cores, central processing units (CPUs), or DSPs. For example, an alternative embodiment can have one DSP, 10 DSPs, 12 DSPs, or any other number. In the embodiment of FIG. 1, shared memory 110, shared memory controller 120, and DSPs 130-1 through 130-6 can be clocked at a common frequency, or can be clocked independently. Also, shared memory 110, shared memory controller 120, and DSPs 130-1 through 130-6 can be clocked synchronously or asynchronously. If synchronously, the clock speeds for shared memory 110 and shared memory controller 120 are proportional to the clock speed for DSPs 130-1 through 130-6. Additionally, each can be clocked at a different frequency, and with different clock phase if clocked asynchronously. For example, in one embodiment, assume DSPs 130-1 through 130-6 are clocked at a frequency F. Shared memory 110 and shared memory controller 120 may be clocked at ½F. In another embodiment, shared memory 110 may be clocked at ½F, while shared memory controller 120 is clocked at ⅓F asynchronously with a different phase. A particular embodiment's clock speeds can be determined to balance performance with power, as over-clocking a device generally wastes power and under-clocking introduces latency.

DSPs 130-1 through 130-6 each can generate read/write commands that are simultaneously submitted to shared memory controller 120. Each of the commands corresponds to a transaction that will read from or write to shared memory 110 via bus 140. Shared memory controller 120 is configured to concurrently scan-in all active read/write commands and respectively divide them into beat-level commands. For example, an 8 beat read command is divided into 8 beat-level read commands. Shared memory controller 120 is further configured to carry out beat-level arbitration on the beat-level commands. Beat-level arbitration mitigates the chances of having any one transaction experience large latencies. In embodiments where shared memory 110 comprises banks of physical memory, beat level arbitration further allows concurrent dispatch of beat-level commands to the various banks of physical memory.

In certain embodiments, shared memory controller 120 also combines beat-level responses from shared memory 110 into single responses for each transaction. For example, given an 8 beat read transaction, read data is retrieved from various physical memory blocks in shared memory 110 8 times. Certain embodiments of shared memory controller 120 collect each of those 8 beat-level read data responses and combine them into a single read data response for the read transaction. Shared memory controller 120 can then return the read data to whichever DSP commanded the transaction. In another example, given an 8 beat write transaction, acknowledgements are received from the 8 various destination physical memory blocks in shared memory 110. Certain embodiments of shared memory controller 120 collect each of those 8 beat-level write responses and combine them into a single write response for the write transaction.

Figure 2:
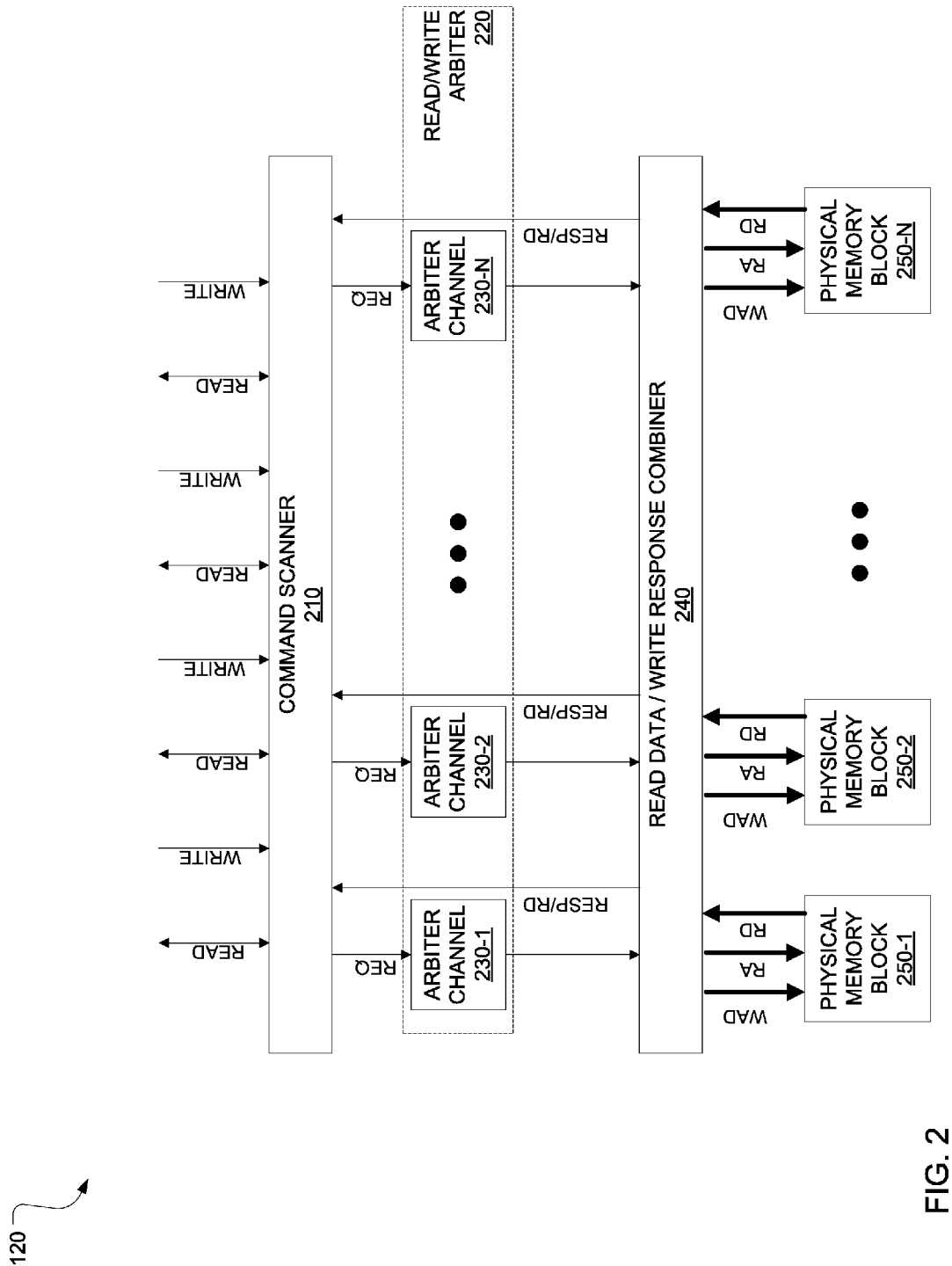
FIG. 2 is a block diagram of one embodiment of a controller for a shared memory.

FIG. 2 is a block diagram of one embodiment of shared memory controller 120 of FIG. 1. Shared memory controller 120 includes a command scanner 210, a read/write arbiter 220, and a read data/write response combiner 240. Shared memory controller 120 is coupled to N physical memory blocks 250-1 through 250-N. Likewise, read/write arbiter 220 includes N arbiter channels 230-1 through 230-N that correspond to the N physical memory blocks. In certain embodiments, each of the N arbiter channels 230-1 through 230-N includes a separate read arbiter and a separate write arbiter.

Command scanner 210 is configured to concurrently scan-in all active commands from the various processing cores, processors, CPUs, or DSPs coupled to shared memory controller 120. Active commands can include both read and write commands simultaneously. Command scanner 210 scans-in the read/write commands and processes them in parallel. In processing the read/write commands, command scanner 210 divides, or breaks, each read/write command into its respective beat-level read/write commands. Beat-level commands are then passed along to an appropriate arbiter channel within read/write arbiter 220 according to the address in physical memory blocks 250-1 through 250-N.

Each of arbiter channels 230-1 through 230-N is coupled to command scanner 210 and is configured to arbitrate beat-level read/write commands according to a priority assigned to its respective transaction. Higher priority transactions generally are allowed before lower priority transactions. Additionally, in certain embodiments, read transactions can be given higher priority than write transactions, or vice versa. Read/write arbiter 220 orders the beat-level read/write commands into a sequence of beat-level commands for each of physical memory blocks 250-1 through 250-N. The arbitration is carried out among arbiter channels 230-1 through 230-N in parallel, or concurrently.

Read data/write response combiner 240 is coupled to physical memory blocks 250-1 through 250-N as well as read/write arbiter 220 and command scanner 210. In carrying out a beat-level write command, a write address and write data (WAD) are dispatched to the appropriate physical memory block. The physical memory block returns a beat-level write response to confirm the beat-level write command was served. Rather than passing each beat-level response back to the originating processor through command scanner 210, read data/write response combiner 240 collects the beat-level write responses and combines them into a single write response for the transaction. The single response is then passed back to command scanner 210 and on to the processor that commanded the transaction.

In carrying out a beat-level read command, a read address (RA) is dispatched to the appropriate physical memory block and the read data (RD) is returned. Read data/write response combiner 240 collects the various beat-level read data from the physical memory blocks and combines it into a single read data response for the transaction. The single read data response is then passed back to command scanner 210 and on to the processor that commanded the transaction.

Figure 3:
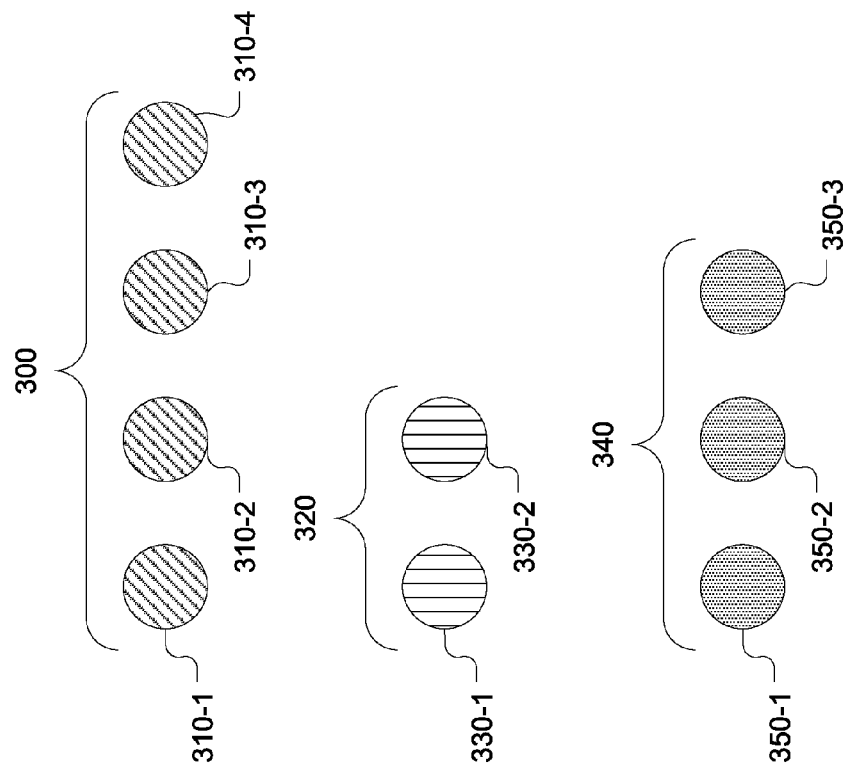
FIG. 3 is an illustration of shared memory transactions.

FIG. 3 is an illustration of three shared memory transactions, transaction 300, transaction 320, and transaction 340. Transaction 300 includes four beats, beats 310-1 through 310-4. Transaction 320 includes two beats, beats 330-1 and 330-2. Transaction 340 includes three beats, beats 350-1, 350-2, and 350-3.

Figure 4:
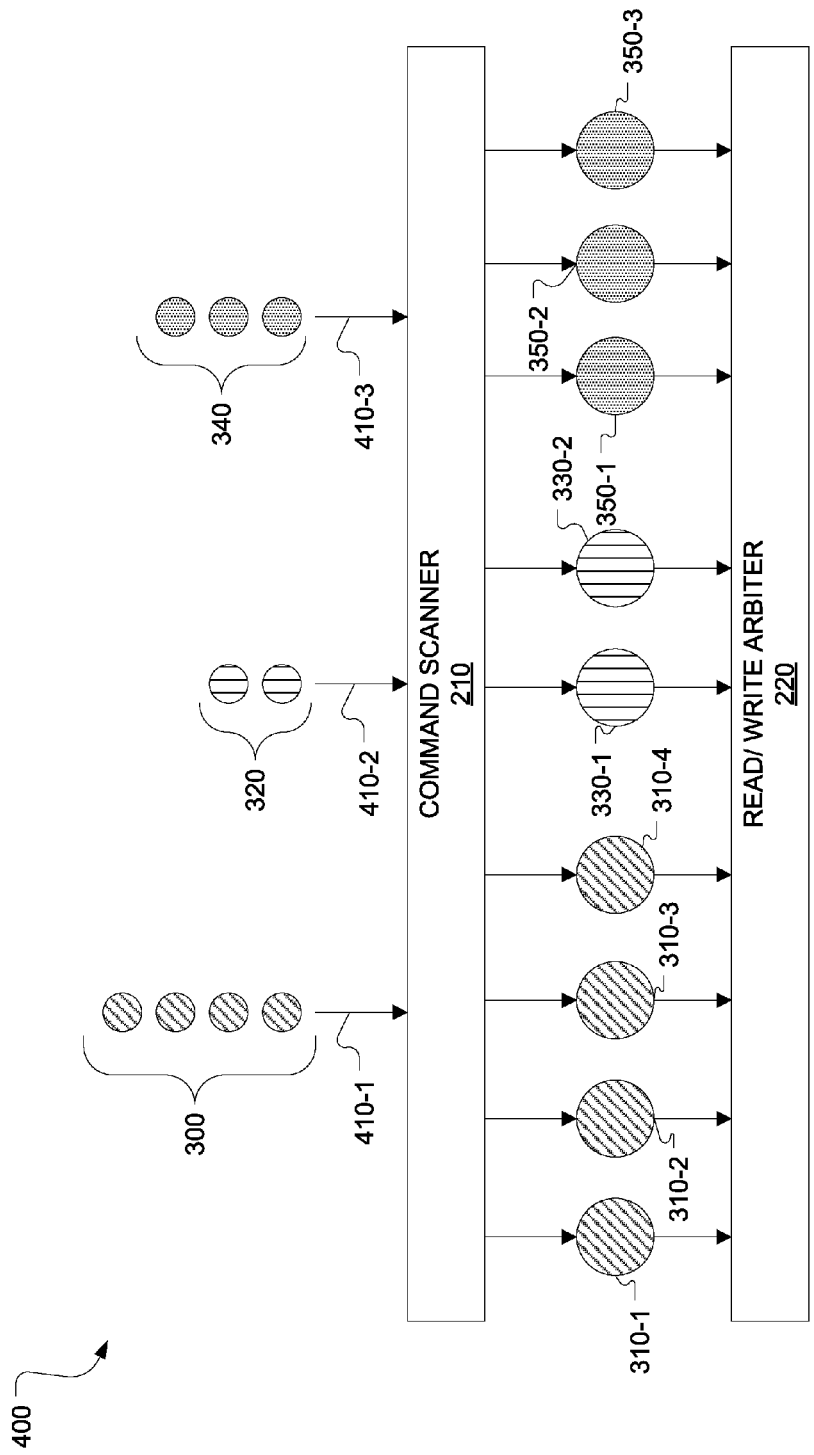
FIG. 4 is an illustration of shared memory transactions flowing through an embodiment of a controller for a shared memory.

FIG. 4 is an illustration of the shared memory transactions of FIG. 3 flowing through an embodiment of a controller 400 for a shared memory. Controller 400 includes command scanner 210 and read/write arbiter 220 of FIG. 2. Transaction 300, transaction 320, and transaction 340 arrive simultaneously at command scanner 210 in the form of three corresponding read/write commands: a command 410-1, a command 410-2, and a command 410-3. Command scanner 210 concurrently scans in the three read/write commands and divides each into its respective beat-level read/write commands. Command scanner 210 divides transaction 300 into beats 310-1 through 310-4, transaction 320 into beats 330-1 and 330-2, and transaction 340 into beats 350-1, 350-2, and 350-3.

The beat-level commands are then passed to read/write arbiter 220. In certain embodiments, command scanner 210 is connected to read/write arbiter 220 by direct connections, while in other embodiments they are connected by a switching fabric. Each of the beat-level commands passes to an arbiter channel according to its destination memory address.

The arbiter channels then determine the sequence in which the beat-level commands are to be dispatched to the various physical memory blocks to which controller 400 is coupled. The sequence is determined according to a respective priority for each of transactions 300, 320, and 340. For example, consider an embodiment where transaction 300 is highest priority, then transaction 320, and finally transaction 340. Furthermore, assume that one physical block of memory is addressed by at least one beat-level command for each of the three transactions. For instance, beat 310-1, beats 330-1 and 330-2, and beat 350-1. The arbiter channel in read/write arbiter 220 corresponding to the one physical block of memory considers the transaction priority for each of those beats and generates a sequence of beat 310-1, beat 330-1, beat 330-2, and beat 350-1. Alternatively, if another higher-priority transaction were to be scanned in after beat 310-1 and beat 330-1 had been dispatched, divided into beat-level read/write commands A, B, and C, and if at least one of those beat-level read/write commands is addressed to the one physical block of memory, the arbiter channel corresponding to the one physical block of memory would modify the sequence to delay beat 330-2 and beat 350-1 and allow whichever of beats A, B, and C are addressed to that physical block of memory to be dispatched. In another alternative, each of the respective beat-level read/write commands for transactions 300, 320, and 340 may be addressed to different physical blocks of memory. In that embodiment, all beat-level commands would be arbitrated and dispatched concurrently, in parallel.

Figure 5:
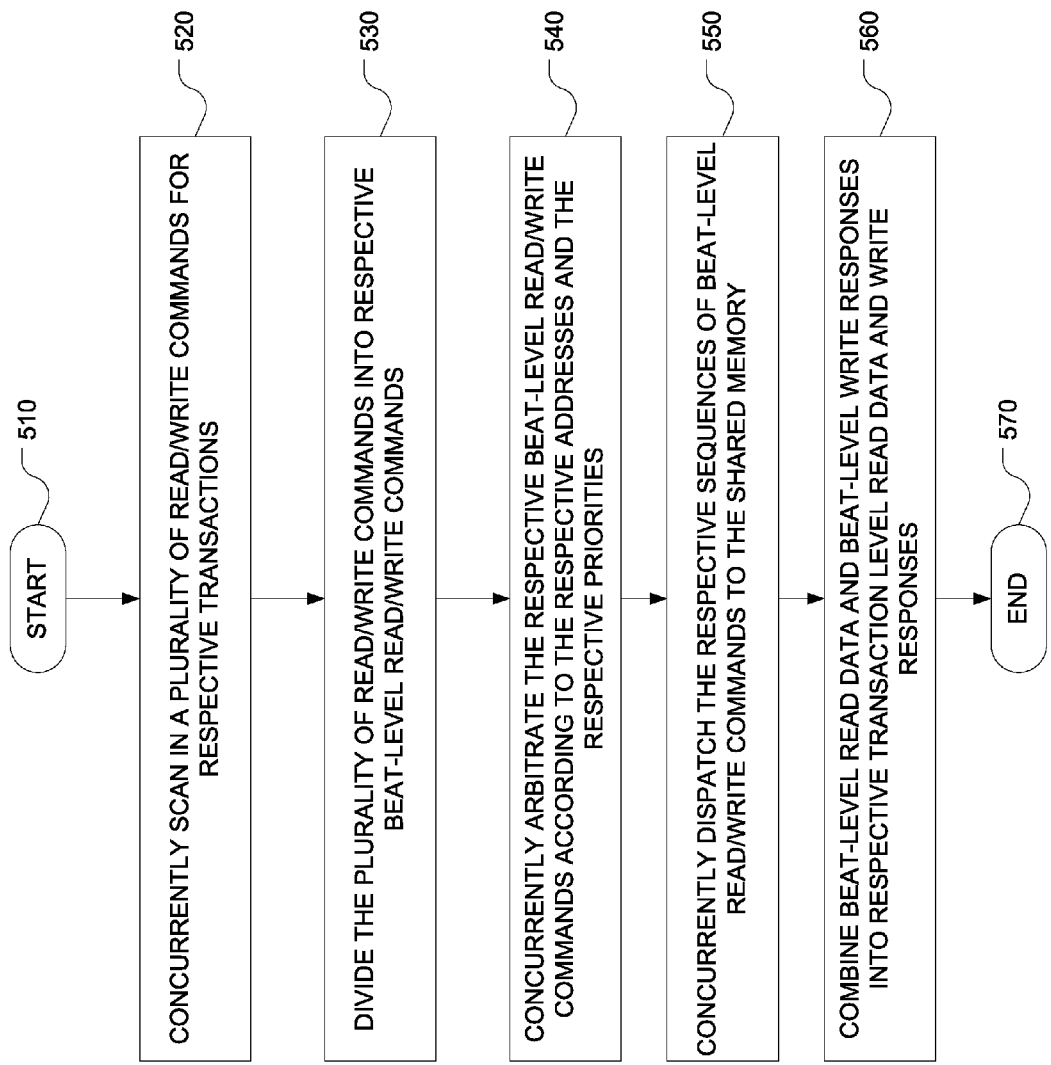
FIG. 5 is a flow diagram of one embodiment of a method for controlling a shared memory.

FIG. 5 is a flow diagram of one embodiment of a method of controlling a shared memory. The method begins at a start step 510. At a command scanning step 520, a plurality of read/write commands is concurrently scanned in. The plurality of read/write commands can originate from one or more processor core, processor, CPU, or DSP. Each of the plurality of read/write commands corresponds to a transaction with the shared memory. Each transaction is divisible into one or more beats, the size of which depends on the bus width of the bus through which access to the shared memory is had. At a dividing step 530, the read/write commands are divided into respective beat-level read/write commands. Each of the beat-level read/write commands is destined for a particular address in the shared memory and has a priority relative to all other transactions. For a given transaction, the shared memory address for each beat-level read/write command can vary. The given transaction can cause data to be written to or read from multiple physical blocks of memory. Command scanning step 520 and dividing step 530 are generally carried out by a command scanner.

The beat-level read/write commands are concurrently arbitrated at an arbitration step 540. Arbitration is carried out for each physical block of the shared memory in parallel, via a plurality of arbiter channels corresponding to a plurality of physical blocks of shared memory. An arbiter channel can have a read arbiter and a write arbiter, allowing for independent arbitration of beat-level read commands and beat-level write commands. Arbitration is carried out concurrently per physical block of memory to determine a sequence of beat-level read/write commands according to their respective transaction priorities. The beat-level read/write commands are then concurrently dispatched, at a dispatch step 550, to their respective physical blocks of shared memory according to the sequence determined in arbitration step 540.

In certain embodiments, the method also includes a combining step 560. Combining step 560 consolidates responses for read and write transactions before passing them back to the command scanner. During a read transaction, at combining step 560, the beat-level read data is collected from the various physical blocks of memory. Once all the read data for the corresponding transaction is collected, a single read data response is passed back toward the originating processor, processor core, CPU, or DSP. During a write transaction, the various physical blocks of memory generate beat-level write responses to confirm the beat-level write command has been served. At combining step 560, the beat-level write responses are collected from various physical blocks of memory, and a single write response is passed back toward the originating processor, processor core, CPU, or DSP. The method then ends at an end step 570.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for controlling access to a shared memory, comprising:
   concurrently scanning-in a plurality of read/write commands for respective transactions, wherein each of the plurality of read/write commands includes respective addresses and respective priorities, wherein each of the respective transactions is divisible into at least one beat, and wherein at least one of the respective transactions is divisible into multiple beats;
   dividing the plurality of read/write commands into respective beat-level read/write commands;
   generating respective sequences of beat-level read/write commands corresponding to the respective addresses with concurrent arbitrating of the respective beat-level read/write commands according to the respective addresses and the respective priorities; and
   concurrently dispatching the respective sequences of beat-level read/write commands to the shared memory.

2. The method of claim 1 wherein at least one of the plurality of read/write commands comprises a read command for a read transaction to respectively retrieve read data from a plurality of read addresses in the shared memory, wherein the read transaction comprises a plurality of beats corresponding to the plurality of read addresses.

3. The method of claim 2 further comprising combining respective read data from the plurality of beats into a single read response.

4. The method of claim 1 wherein at least one of the plurality of read/write commands comprises a write command for a write transaction to respectively store write data into a plurality of write addresses in the shared memory, wherein the write transaction comprises a plurality of beats corresponding to the plurality of write addresses.

5. The method of claim 4 further comprising combining respective write acknowledgments for the plurality of beats into a single write response.

6. The method of claim 1 wherein the shared memory comprises a plurality of interleaved memory banks.

7. The method of claim 1 wherein the shared memory comprises a plurality of linearly arranged memory banks.

8. The method of claim 1 further comprising receiving the plurality of read/write commands from at least one processor.

9. The method of claim 8 wherein the at least one processor issues a read command and a write command simultaneously.

10. The method of claim 1 wherein the respective addresses include an absolute memory address.

11. The method of claim 1 wherein the respective addresses include a memory bank number and an offset.

12. A controller for a shared memory, comprising:
    a command scanner configured to concurrently scan-in a plurality of read/write commands for respective transactions and divide each of the respective transactions into respective beat-level read/write commands; and
    a plurality of read/write arbiters corresponding to a plurality of shared memory blocks in the shared memory, coupled to the command scanner, and configured to:
    generate respective sequences of beat-level read/write commands corresponding to the plurality of shared memory blocks with concurrent arbitration of the respective beat-level read/write commands according to respective priorities, and
    concurrently dispatch the respective sequences to the plurality of shared memory blocks to access the plurality of shared memory blocks.

13. The controller of claim 12 wherein at least one of the plurality of read/write commands comprises a read command for a read transaction to respectively retrieve read data from a plurality of read addresses among the shared memory blocks, wherein the read transaction comprises a plurality of beats corresponding to the plurality of read addresses.

14. The controller of claim 13 further comprising a read data combiner coupled to the command scanner and the plurality of read/write arbiters, and configured to combine respective read data from the plurality of beats into a single read response to the command scanner.

15. The controller of claim 12 wherein at least one of the plurality of read/write commands comprises a write command for a write transaction to respectively store write data into a plurality of write addresses in the plurality of shared memory blocks, wherein the write transaction comprises a plurality of beats corresponding to the plurality of write addresses.

16. The controller of claim 15 further comprising a write response combiner coupled to the command scanner and the plurality of read/write arbiters, and configured to combine respective write acknowledgments for the plurality of beats into a single write response to the command scanner.

17. The controller of claim 12 wherein the plurality of shared memory blocks comprise interleaved memory banks.

18. The controller of claim 12 wherein the plurality of shared memory blocks comprise linearly arranged memory blocks.

19. The controller of claim 12 wherein the command scanner is couplable to at least one digital signal processor (DSP) configured to generate and submit at least one of the plurality of read/write commands to the command scanner.

20. The controller of claim 12 wherein the command scanner is couplable to at least one processing core configured to generate and submit at least one of the plurality of read/write commands to the command scanner.

21. The controller of claim 12 wherein the command scanner is couplable to at least one central processing unit (CPU) configured to generate and submit at least one of the plurality of read/write commands to the command scanner.

22. A system on a chip (SOC), comprising:
    a plurality of shared memory blocks having a plurality of respective addresses;
    a plurality of processors configured to generate a plurality of respective read/write commands to access the plurality of shared memory blocks via corresponding transactions that are divisible into respective pluralities of beats; and a shared memory controller coupled between the plurality of shared memory blocks and the plurality of processors, and having:
  a command scanner configured to concurrently scan-in and divide the plurality of respective read/write commands into respective pluralities of beat-level read/write commands, and
  a plurality of read/write arbiters corresponding to the plurality of shared memory blocks and configured to:
    generate respective sequences of beat-level read/write commands corresponding to the plurality of shared memory blocks with concurrent arbitration of the respective pluralities of beat-level read/write commands for the plurality of shared memory blocks according to respective priorities, and
    concurrently dispatch the respective sequences to the plurality of shared memory blocks.

23. The SOC of claim 22 wherein the shared memory controller further comprises a read data/write response combiner configured to:
  collect beat-level write responses from the plurality of shared memory blocks to form a single respective write response for each write transaction of the corresponding transactions; and
  collect beat-level read data from the plurality of shared memory blocks to form a single respective read data response for each read transaction of the corresponding transactions.

24. The SOC of claim 22 wherein the plurality of shared memory blocks are clocked at a first frequency, the plurality of processors are clocked at a second frequency, and the shared memory controller is clocked at a third frequency, wherein the first frequency, the second frequency, and the third frequency are synchronous.

25. The SOC of claim 24 wherein the first frequency, the second frequency, and the third frequency are proportional to each other.

26. The SOC of claim 22 wherein the plurality of shared memory blocks are clocked at a first frequency, the plurality of processors are clocked at a second frequency, and the shared memory controller is clocked at a third frequency, wherein the first frequency, the second frequency, and the third frequency are asynchronous.

27. The SOC of claim 26 wherein the first frequency, the second frequency, and the third frequency are different from each other.

28. The SOC of claim 22 wherein the shared memory controller is coupled to the plurality of shared memory blocks by a bus having a bus width.

29. The SOC of claim 28 wherein a size of each beat in the respective pluralities of beats is a function of the bus width, and wherein a count of beat-level read/write commands in the respective pluralities of beat-level read/write commands is a function of the size of each beat.

30. The SOC of claim 29 wherein the count of beat-level read/write commands is also a function of a number of simultaneous read/write commands allowable by each physical memory bank of the plurality of shared memory blocks.

31. The SOC of claim 22 wherein the plurality of shared memory blocks comprise a plurality of interleaved physical memory banks.

32. The SOC of claim 22 wherein the plurality of shared memory blocks comprise a plurality of linearly arranged physical memory banks.

* * * * *